United States Patent
Li et al.

(10) Patent No.: US 9,084,012 B2
(45) Date of Patent: *Jul. 14, 2015

(54) USING DISTRIBUTED LOCAL QOS OPTIMIZATION TO ACHIEVE GLOBAL QOS OPTIMIZATION FOR VIDEO CONFERENCING SERVICES

(71) Applicant: Broadcom Corporation, Irvine, CA (US)

(72) Inventors: Gordon Li, San Diego, CA (US); Xuemin Chen, Rancho Santa Fe, CA (US); Arlen Kirchoff, Jr., Suwanee, GA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,793

(22) Filed: Jan. 21, 2014

(65) Prior Publication Data

US 2014/0132703 A1    May 15, 2014

Related U.S. Application Data

(63) Continuation of application No. 13/248,454, filed on Sep. 29, 2011, now Pat. No. 8,665,313.

(60) Provisional application No. 61/489,152, filed on May 23, 2011.

(51) Int. Cl.
*H04N 7/14* (2006.01)
*H04N 21/4363* (2011.01)
*H04N 7/15* (2006.01)
(Continued)

(52) U.S. Cl.
CPC ........ *H04N 21/4363* (2013.01); *H04L 12/1827* (2013.01); *H04N 7/152* (2013.01); *H04N 21/2389* (2013.01); *H04N 21/242* (2013.01); *H04N 21/4385* (2013.01); *H04N 21/43615* (2013.01); *H04N 21/64322* (2013.01); *H04N 21/8456* (2013.01)

(58) Field of Classification Search
CPC ......... H04N 7/15; H04N 7/147; H04N 7/141; H04N 7/152
USPC ...................... 348/14.01, 14.08, 14.09, 14.12
See application file for complete search history.

(56) References Cited

U.S. PATENT DOCUMENTS

8,665,313 B2 *   3/2014   Li et al. ...................... 348/14.09
2004/0008635 A1   1/2004   Nelson et al.
(Continued)

*Primary Examiner* — Quoc D Tran
(74) *Attorney, Agent, or Firm* — Foley & Lardner LLP; Christopher J. McKenna; Daniel E. Rose (57) ABSTRACT

A media gateway (MG) that services a plurality of client devices, may be handled at least a portion of video conferencing (VC) processing during a VC call between at least one of said plurality of client devices and at least one other VC client. The portion of the VC processing handled by the media gateway may be offloaded from a centralized VC multipoint control unit (MCU). The MG may handle one or more VC MCU functions, which may comprise video conferencing call control and/or management and/or audio/video (AV) transcoding. The MG may perform localized quality of service (QoS) management, to select, and adaptively control and/or configure resources and/or local links used in the MG and/or in VC clients or neighboring MGs connected to the MG, during VC operations, such as in generating, handling, and/or communicating data or content exchanged during VC calls.

20 Claims, 5 Drawing Sheets

(51) Int. Cl.
*H04L 12/18* (2006.01)
*H04N 21/436* (2011.01)
*H04N 21/643* (2011.01)
*H04N 21/845* (2011.01)
*H04N 21/2389* (2011.01)
*H04N 21/242* (2011.01)
*H04N 21/4385* (2011.01)

(56) References Cited

U.S. PATENT DOCUMENTS

2008/0031196 A1  2/2008  Marathe et al.
2012/0169836 A1  7/2012  Setlur
2012/0300016 A1  11/2012  Li et al.

* cited by examiner

USING DISTRIBUTED LOCAL QOS OPTIMIZATION TO ACHIEVE GLOBAL QOS OPTIMIZATION FOR VIDEO CONFERENCING SERVICES

CLAIM OF PRIORITY

This application is a continuation of U.S. application Ser. No. 13/248,454, filed Sep. 29, 2011, which makes reference to, claims priority to and claims benefit from U.S. Provisional Application Ser. No. 61/489,152 which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/171,097 filed on Jun. 28, 2011;
U.S. application Ser. No. 13/171,123 filed on Jun. 28, 2011;
U.S. application Ser. No. 13/170,503 filed on Jun. 28, 2011; and
U.S. application Ser. No. 13/170,653 filed on Jun. 28, 2011.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for using distributed local QoS optimization to achieve global QoS optimization for video conferencing services.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV, and/or Internet Protocol television (IPTV) based broadcasts. To protect against unauthorized reception and/or use of multimedia content, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for using distributed local QoS optimization to achieve global QoS optimization for video conferencing services, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using distributed local QoS optimization to achieve global QoS optimization for video conferencing services. In various embodiments of the invention, a media gateway may be utilized to provide and/or support video conferencing (VC) services and/or applications in a network serviced by the media gateway. The media gateway may handle at least a portion of video conferencing (VC) processing during a video conference call between a client device (VC client) serviced by the media gateway and one or more other video conferencing (VC) terminals. In this regard, at least a portion of video conferencing (VC) processing that is handled by the media gateway may be offload from one or more conventional video conferencing (VC) multipoint control units (MCUs). Conventional VC multipoint control units (MCUs) are dedicated devices, typically located upstream of the media gateway within the network topology, providing dedicate VC control and/or management functions. Exemplary MCU functions may comprise control and/or management of video conferencing (VC) calls, and/or audio/video (AV) transcoding associated with content exchanged during the video conferencing (VC) calls. The video conferencing (VC) call control and/or management may comprise determining and/or establishing routing paths utilized in exchanging data during video conference (VC) calls. The MCU may also typically provide global quality of service (QoS) management during VC calls.

As part of the offloading of MCU functions to the media gateway, the media gateway may provide localized QoS management functions during VC calls. In this regard, the local QoS management performed by the media gateway may comprise an adaptive localized QoS optimization directed at setting and/or adjusting one or more QoS related parameters in the media gateway, and/or in one or more client devices and/or neighboring media gateway directly or indirectly connected to the media gateway. Exemplary QoS related parameters may comprise, or pertain to local resources, capabilities, and/or links that may be utilized during VC operations. This may comprise coder/decoder (codec) functions, processing or storage resources, processing criteria (e.g. latency, load, and priority), interfaces, and/or communication criteria (bandwidth, latency, error, etc.). The media gateway may negotiate at least some of the QoS related parameters with one or more of the plurality of client devices and/or the other media gateway directly connected to the media gateway. The media gateway may determine a plurality of profiles associated with resources and/or capabilities utilized during VC operations, such as encoding profiles, communication profiles, and/or resource allocation profiles. The media gateway may then select one or more these profiles during local QoS management operations, based on quality characteristics and/or limitations associated with each of these profiles.

Figure 1:
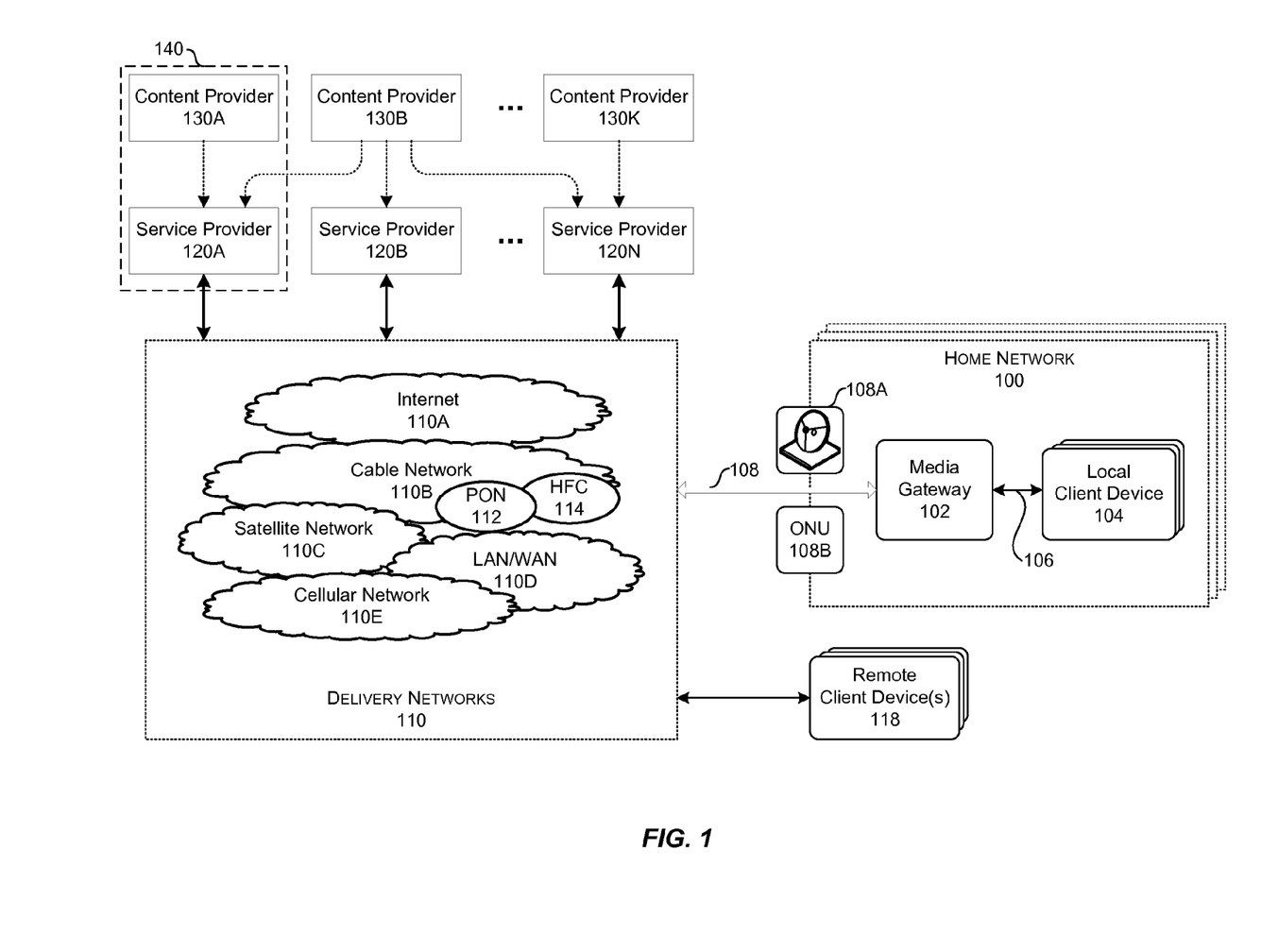
FIG. 1 is a block diagram illustrating an exemplary communication system that comprises a home network serviced by a media gateway, which may be utilized in accordance with an embodiment of the invention.

FIG. 1 is a block diagram illustrating an exemplary communication system that comprises a home network serviced by a media gateway, which may be utilized in accordance with an embodiment of the invention. Referring to FIG. 1, there is shown one or more home networks 100, a plurality of delivery networks 110, a plurality of service providers 120A-120N, and a plurality of content providers 130A-130K. Each home network 100 may comprise one or more local client device 104, and may be serviced by a media gateway 102.

The service providers 120A-120N may comprise various entities that may provide, using different access technologies or protocols, various services to media gateways 102 and/or to devices serviced thereby. The access technologies and services may include, but are not limited to, network access, multimedia, television, Internet, phone, Ethernet, multimedia over coax alliance (MoCA), and/or passive optical network (PON) access for example. Some of the service providers 120A-120N may comprise network access service providers, providing physical layer connections to the media gateway 102. Such physical layer connections may then be utilized to access content provided by the content providers 130A-130K, access services provided by other ones of the service providers 120A-120N, and/or access to intranets or the Internet at-large. The term "network access service provider" as used herein is distinguished from the more generic term "service provider" which may encompass services other than providing physical access to a network. Cable television providers, plain old telephone service (POTS) providers, digital subscriber line (DSL) providers, cellular providers, WiMAX providers, and satellite providers are examples of network access service providers. In an exemplary aspect of the invention, the media gateway 102 may be operable to connect to multiple service providers 120A-120N to facilitate receiving content originating from one or more of the content providers 130A-130K.

The content providers 130A-130K may comprise various entities and/or networks which may generate, capture, and/or package content that may be distributed to end-users, such as via the service providers 120A-120N and/or the delivery networks 110. The "content" may comprise audio, video, multimedia, e-book, gaming, and/or other content. The delivered content may comprise commercial content, such as content generated by film or television production and/or distribution companies (e.g. Paramount Pictures or Warner Bros.), and/or personal content, such as user-generated content. The content may be downloadable and/or streaming, rented and/or purchased. Content originating from the content providers 130A-130K may be distributed to the end-users (e.g. consumers) by the service providers 120A-120N. The content providers 130A-130K and service providers 120A-120N may be separate entities. In some instances, however, a single provider may provide both content and services, as demonstrated by dashed line 140 for example. That is, an entity that functions as a service provider may also generate and/or provide content.

The delivery networks 110 may comprise one or more networks that may enable wireless and/or wired communication among a plurality of local and/or remote entities, based on one or more networking and/or communication infrastructures. In this regard, the delivery networks 110 may enable distribution and/or exchange of multimedia content to and/or among end-users. The network connectivity available via the delivery networks 110 may be based on one or more communication standards and/or protocols. The delivery networks 110 may comprise, for example, Internet 110A, cable network 110B, and/or satellite network 110C, wireless local network area/wide network area (LAN/WAN) 110D, and/or cellular network 110E.

The cable network 110B may comprise suitable distribution nodes, systems, and/or subnetworks that may enable forwarding of communication between cable providers and a plurality of consumers. In this regard, the cable network 110B may comprise a network of fiber optics and/or coaxial cables for use in cable broadcasts. For example, in addition to traditional coaxial based networks, the cable network 110B may comprise one or more passive optical networks (PON) 112 and/or one or more hybrid fiber-coax (HFC) networks 114. Receiving optical signals, at the home network 100 may require use of dedicated devices, such as optical network unit (ONU) 108B. The ONU 108B may comprise suitable logic, circuitry, interfaces, and/or code that may be operable to terminate fiber connections, to facilitate receiving of incoming optical signals, and transform them into electrical signals that may be further processed within the home network 100, such as via the media gateway 102.

The satellite network 110C may comprise suitable distribution nodes, systems, and/or subnetworks that may enable communication of satellite broadcasts by satellite providers to a plurality of consumers. For example, the satellite network 110C may comprise a plurality of orbiting satellite nodes and/or one or more terrestrial centers in a satellite broadcast system. Receiving satellite signals may require use of dedicate devices, such as satellite receiver 108A. The satellite receiver 108A may comprise suitable logic, circuitry, interfaces, and/or code that may be operable to receive incoming satellite signals, and transform them into signals that may be further processed within the home network 100, such as via the media gateway 102.

The LAN/WAN network 110D may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks.

The cellular network 110E may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA2000, Long Term Evolution (LTE), WiMAX, High-Speed Downlink Packet Access (HSDPA), Global System for Mobile Communications (GSM), General Packet Radio Services (GPRS), Enhanced Data Rates for Global Evolution (EDGE), and/or other forms of Universal Mobile Telecommunication System (UMTS).

Each home network 100 may correspond to a location that may comprise a plurality of devices which may be serviced and/or managed by the media gateway 102. In this regard, the location may be a residence (e.g. home or apartment), a small business, a school, a library, and/or other like settings in which users may want to obtain access to services and/or networks. The media gateway 102 may be utilized in the home network 100 to provide connectivity within the home network 100, and/or between the home network 100 and the service providers 120A-120N (and/or the content providers 130A-130K), via the delivery networks 110.

The media gateway 102 may comprise suitable logic, circuitry, interfaces, and/or code that may be operable to implement various aspects of the invention. In this regard, the media gateway 102 may be operable to communicate with the content providers 130A-130K, the service providers 120A-120N, and the local client devices 104. In this manner, the media gateway 102 may enable bidirectional communication of content and/or other information between the content providers 130A-130K, the service providers 120A-120N and the client devices 104. To support content delivery operations, the media gateway 102 may function and/or be configured as a set-top box (STB) and/or an Internet Protocol Television (IPTV) gateway. Communications between the media gateway 102 and the content providers 130A-130K and/or service providers 120A-120N may be carried over optical, wired, and/or wireless links of the delivery networks 110. The media gateway 102 may be operable to handle multiple physical layer connections to multiple ones, or portions, of the delivery networks 110, where different ones or portions of the delivery networks 110 are owned, operated, leased, or otherwise associated with different ones of the network access service providers 120A-120N. In some instances, the media gateway 102 may be operable to concurrently communicate over multiple physical connections provided by the multiple network access service providers. For example, the media gateway 102 may be operable to configure and/or utilize one or more connections 108 to the delivery networks 110. The connections 108 may comprise wired and/or wireless connections between the media gateway 102 and the delivery networks 110.

Within the home network 100, the media gateway 102 may service a plurality of client devices, which may comprise local client device 104. The media gateway 102 may also service one or more remote client device 118, associated with the home network 100 and/or the media gateway 102, but located external to the home network 100. The client devices may comprise personal and/or household devices that may be operable to interact with, and/or be communicatively coupled to the media gateway 102. In this regard, the local client devices 104 and/or the remote client devices 118 may comprise content consuming devices. Exemplary client devices may comprise, for example, televisions, computers (desktops or laptops), smartphones, tablets, digital video recorder (DVR), and/or personal video recorder (PVR). Communications between the media gateway 102 and the client devices may be carried over optical, wired, and/or wireless links. Within the home network 100, the media gateway 102 may interact with the local client devices 104 via links 106. Exemplary links 106 may comprise High-Definition Multimedia Interface (HDMI) cables, 60 GHz WiGig wireless connections, wired Ethernet connections, WiFi connections, multimedia over coax alliance (MoCA) connections, and/or HomePNA connections. The media gateway 102 may interact with the remote client devices 118, using indirectly connections, such as via the delivery networks 110. For example, communication between the gateway 102 and the remote client devices 118 may be performed as IP interactions via the Internet 110A.

During communication via the media gateway 102, such as when forwarding data or content to/from the client devices, the media gateway 102 may be operable to perform various related operations or functions, as network access processing comprising PHY/MAC, and/or transport layer processing, as well as encryption and/or decryption, user and/or device authentication, and/or video and/or audio processing (e.g. encoding/decoding).

While the media gateway 102 is shown in FIG. 1 as a single and separate device, the invention need not be so limited. In one embodiment of the invention, the media gateway functionality may be implemented in a distributed manner over two or more devices. Furthermore, the media gateway may be implemented as a virtual platform, for example in instances where it may be implemented in distributed manner. In another embodiment of the invention, some or all of the functionality of the media gateway may be implemented within one of the televisions available in the home.

As illustrated in FIG. 1, a plurality of home networks 100 may be connected to the delivery networks 110, and these home networks 100 may operate in substantially the same manner. Accordingly, by having multiple home networks connected to the delivery networks 110, various applications, such as peer-to-peer communication and/or data aggregation operations may be possible provided by utilizing the media gateways 102 in the home networks 100. For example, client devices 104 in different home networks 100 may communicate peer-to-peer connections, which may be established by corresponding media gateways 102, using direct connection therebetween and/or indirect connections, such as via Internet 110A for example.

In operation, the media gateway 102 may operate as an interface device within the home network 100, allowing the client devices 104 to interact within the home network 100, and/or allowing interactions between the client devices 104 and remote client devices 110, other home networks 100, the service providers 120A-120N and/or the content providers 130A-130K. This may enable, for example, service providers 120A-120N and/or content providers 130A-130K to interact with the client devices 104 in a home network. In this regard, the media gateway 102 may be operable to configuring the plurality of connections 108 for use during such access. The connections 108 may comprise optical, wired and/or wireless connections between the media gateway 102 and the delivery networks 110. Accordingly, the media gateway 102 may enable and/or support delivery and/or communication of data, such as multimedia content for example, to and/or from the home network 100. In this regard, multimedia content may be communicated via the delivery networks 110. Content delivery and/or exchange may comprise use of traditional content delivery services, comprising traditional terrestrial (over-the-air), cable, and/or satellite delivery services, and/or IP based streaming or downloading. The media gateway 102 may distribute the content to one or more client devices in a home network, for consumption. The media gateway may also allow communication of content generated by one or more of the client devices. Beyond serving as interfacing device in the home network 100, the media gateway may perform, directly and/or indirectly using other devices or resources in the home network 100, dedicated processing and/or functions associated with data communication and forwarding, such encoding/decoding, compressing/decompression, encryption/decryption, and/or user validation.

The media gateway 102 may also provide and/or support various other services and/or application in the home network 100. For example, the media gateway 102 may be operable to provide and/or support video conferencing (VC) applications and/or services. In this regard, at least some of the client devices 104 serviced by the media gateway 102 may be utilized as video conferencing (VC) terminals during video conference calls. During such video conference calls, one or more client devices 104 in the home network 100 may be utilized in capturing and/or generating audio/video (AV) content corresponding to user input, and/or in playing back AV content corresponding to user output. The AV content communicated from and/or to the client devices 104 may be routed and/or forwarded via the media gateway 102. In this regard, the media gateway 102 may utilize its network access physical connections for communicating, via the delivery networks 110, the AV content associated with video conference calls between client devices 104 in the home network 100 and remote video conferencing (VC) clients. In some instances, the media gateway 102 may enable routing the AV content associated with video conference calls within the home network 100, such as between different client devices 104, in the home network 100, which are being utilized as video conferencing (VC) clients in the same video conference calls.

In an exemplary aspect of the invention, the media gateway 102 may implement at least a portion of multipoint control unit (MCU) functions during video conferencing (VC) applications. In this regard, in conventional video conferencing operations, dedicated centralized devices, such as centralized Multipoint Control Units (MCUs) may be used in managing, controlling, and/or handling video conferencing related operations. In this regard, conventional centralized MCUs may be located in the core network, and may be utilized to serve a large number of video conferencing clients. The centralized MCUs may be utilized in routing video conferencing communications and/or bridging video conferencing connections, to enable a plurality of video conferencing terminals, and/or intermediary devices servicing these terminals such as gateways, to participate in multipoint video conferences. The main functions of centralized MCUs may comprise video conference control and management, and/or audio/video (AV) transcoding operations associated with VC clients in particular video conference calls. Use of conventional centralized MCUs, however, may be costly because these MCUs are typically expensive equipment. Accordingly, to eliminate and/or reduce the need for using centralized MCUs during video conferencing operations, at least a portion of centralized MCU functions may be moved to the media gateways. Configuring the media gateways to function as MCUs during video conferencing operations may be made possible because of the media gateway already available control and/or audio/video (AV) transcoding capabilities, for example. Use of media gateways to provide MCU functions may be desirable because it may eliminate or reduce the number of conventional centralized MCUs that may otherwise be used during VC operations. Use of media gateways to provide MCU functions may also allow establishing shorter and/or more efficient VC connections, by enabling the VC clients to connect to each other without necessitating traversing all the way up to and/or through the core network, where conventional MCUs may reside. Using shorter peer-to-peer VC connections may enable reducing and/or optimizing network bandwidth and/or load, and may enable incurring less delay/jitter/packet losses since such probability of such losses tend to increase with increases in connection length and/or number of hops required. Use of media gateways to provide MCU functions may also allow the local video content mediums, such as live channels or DVR, to be used as VC sources.

Figure 2:
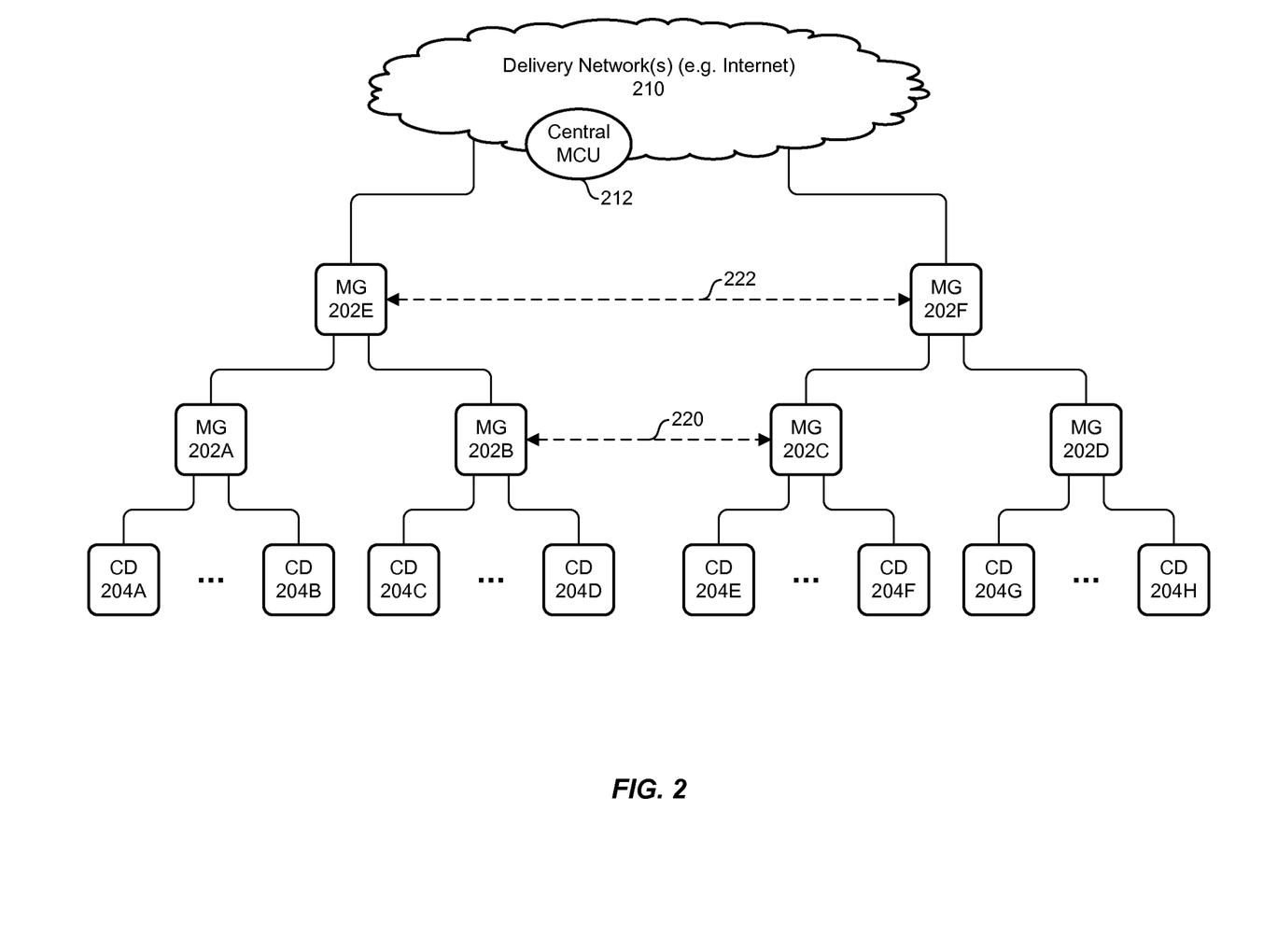
FIG. 2 is a block diagram illustrating an exemplary communication model that may utilize media gateways as Multipoint Control Units (MCUs) during video conferencing (VC) applications, in accordance with an embodiment of the invention.

FIG. 2 is a block diagram illustrating an exemplary communication model that may utilize media gateways as Multipoint Control Units (MCUs) during video conferencing (VC) applications, in accordance with an embodiment of the invention. Referring to FIG. 2, there is shown a plurality of media gateways 202A-202F, plurality of client devices 204A-204H, and a delivery network 210. Also shown in FIG. 2 is a central Multipoint Control Unit (MCU) 212.

Each of the media gateways 202A-202F may be similar to the media gateway 102, substantially as described with respect to FIG. 1. In this regard, each of the media gateways 202A-202F may be operable to service a plurality of client devices. For example, as shown in FIG. 2 the media gateway 202A may service client devices 204A-204B; the media gateway 202B may service client devices 204C-204D; the media gateway 202C may service client devices 204E-204F; and the media gateway 202D may service client devices 204G-204H. During VC calls, the client devices 204A-204H may be utilized as video conferencing terminals (or clients) during video conferences among users of these devices.

In operation, the client devices 204A-204H may be utilized in video conferences conducted among users of these devices. In this regard, at least some of the client devices 204A-204H may be operable to function as video conferencing (VC) terminals (or clients) during video conferences. During such video conferences, VC terminals may be utilized to capture and/or generate audio/video (AV) content corresponding to user input during video conference calls, and may communicate the AV content to one or more other VC terminals. The VC terminals may also receive, during such video conferences, AV content from other VC terminals, and may process the received AV content to generate corresponding audio and/or video for playback as user output. The AV content exchanged between the VC terminals during video conference calls may be communicated via media gateways servicing the VC terminals, such as media gateways 202A-202F, and/or the delivery network 210.

In accordance with conventional video conferencing operations, centralized Multipoint Control Units (MCUs), such as MCU 212, which may comprise dedicated network devices that be utilized in establishing, controlling, and/or managing the video conferences. In this regard, the MCU 212 may receive and/or handle requests for establishment of VC calls among the client devices, and may determine the appropriate routes for exchanging AV content during established VC calls. For example, the MCU 212 may receive a request from client device 204C, via media gateways 202B and 202E, to establish VC call with client device 204E. The MCU 212 may setup the VC call route, such as, for example, to run from client device 204C via media gateways 202B and 202D to MCU 212, and then back to client device 204E, via media gateways 202F and 202C. Furthermore, during VC call the MCU 212 may be operable to perform the required audio/video (AV) transcoding.

In an exemplary aspect of the invention, at least a portion of multipoint control unit (MCU) functions during video conferencing (VC) applications may be moved to the media gateways. For example, one or more of the media gateways 202A-202F may be configured to implement at least a portion of the functions typically performed by the MCU 212 during VC calls among the client devices 204A-204H. In this regard, the media gateways 202A-202F may be operable to handle such functions as establishing and/or setting VC calls, adaptively and/or dynamically controlling and/or managing the VC calls, and/or performing at least a portion of AV transcoding processing performed during forwarding of VC related AV content. For example, with respect to the example described above, in accordance with an embodiment of the invention, the media gateway 202B may be operable to handle the VC call request sent by client device 204C. The media gateway 202B may be operable to determine and/or establish the VC call routes in lieu of the MCU 212. Because the media gateways 202A-202F may implement various MCU functions, the VC call routes established by media gateways functioning as MCUs may be configured differently, without necessitating traversing the delivery network 210 for example, since use of the MCU 212 may not be needed during VC call related operations. In this regard, the VC call route may only be established through only the media gateways, using direct or indirect gateway-to-gateway connections. For example, the media gateways 202B and 202C, or the media gateways 202E and 202F may be operable to establish and/or setup direct connections, using WiFi connections for example, when these media gateways are located within suitable connectivity ranges. Accordingly, the established route for the VC call between client devices 204C and 204E may comprise direct gateway-to-gateway connection 220 between media gateways 202B and 202C, or indirect gateway-to-gateway connection 222 between media gateway 202E and 202F.

Furthermore, when functioning as MCUs, the media gateways 202A-202F may also be operable to perform content transcoding associated with the AV content exchanged between client devices during the VC calls. In this regard, the media gateways 202A-202F may be operable to utilize processing and/or transcoding capabilities and/or resources which may be available to support typical operations and/or applications of the media gateways, such as during content delivery operations as described with respect to FIG. 1.

In various embodiments of the inventions, the media gateway 202A-202F may provide, when functioning as MCUs, quality of service (QoS) management during video conferencing (VC) calls. In this regard, QoS management may relate to quality of data generation, particularly audio-video (AV) content, and to the quality of data communication, such as during exchange of AV content during the VC calls. In this regard, controlling AV content generation may comprise selecting particular audio and/or video encoding or compression scheme or protocol, and/or adaptively adjusting or configuring the selected encoding or compression protocol, or use thereof. For example, various encoding protocols may be available for use by the VC clients and/or the media gateways. Exemplary encoding protocols may comprise H.261, H.263, H.264, MPEG-2, MPEG-4, AVC, VC1 and VP6 for video; and WAV, MP3, MP2, WMA, G.711, G.722, G.723, G.726, and/or G.729 for audio. Each of these encoding protocols may have distinct characteristics and/or limitations, resulting in varying corresponding quality of the encoded data, which may be gauged based on the size of encoded data and/or characteristics or required reconstruction at the receiving end. For example, some encoding schemes may incorporate lossy compression, in which some of the data may discarded, allowing for enhance (reduced) size of encoded data, whereas other encoding schemes may incorporate lossless data compression allowing for reconstruction of the exact original data to be from the compressed data but at the expense of larger size.

With respect to content communication, QoS management may comprise selecting and/or configuring links utilized to communicate the AV content. The link selection and/or configuration may be based on communication quality related parameters, which comprise, for example, maximum bandwidth, guaranteed throughput, communication latency, delivery errors and/or losses (e.g. dropped packets), delivery order (e.g. in-order or out-of-order), and/or jitter related issues, which may arise from variation in delays with respect to different segments of the communicated data. For example, controlling AV content communication may comprise selecting a particular communication interface available in the VC clients and/or the media gateway. In this regard, an "interface" may correspond to particular physical layer (e.g., wired, wireless, or optical), and a corresponding communication protocol or standard (e.g., Ethernet, MoCA, WiFi, WiMAX, Bluetooth, Cellular, etc.) for use therewith. Therefore, the selection of the interface may be based on determination of communication quality associated with available physical layers and/or communication protocols or standards, or all combinations thereof. The QoS management may also comprise adaptively configuring and/or adjusting communication related processing based on selected interface, and the handling of data forwarding via the interface. The outcome of quality of service (QoS) management may dictate whether AV content may be exchanged as, for example, high-definition (HD) video or standard-definition (SD) video.

In accordance with conventional video conferencing operations, centralized MCUs, such as MCU 212, may handle qualify of service (QoS) management during VC calls. In this regard, the MCU 202 may determine and/or implement a global end-to-end QoS scheme, which may be applied uniformly to all VC clients and/or any media gateways traversed during the VC call. For example, the MCU 212 may determine, in accordance with a global QoS scheme, global AV processing and/or communication rules that may be applied similarly to all the VC clients and/or the media gateways. Such global QoS management scheme, however, may not be optimal or desirable because it may sacrifice overall user experience, since local and broadband links corresponding to the VC client and/or media gateway population usually have varying localized levels of QoS. In other words, overall QoS may be optimized and/or enhanced by performing QoS locally, separately at each media gateway and/or VC client based on optimal locally determined QoS criteria, in accordance with and/or based on the capabilities and/or availability of processing and/or communicative resources at each of the VC clients and/or the media gateways.

Accordingly, in various embodiments of the invention, the distributed MCU architecture implemented by offloading at least some of the MCU functions to the media gateways may be configured to incorporate localized QoS management functions into the media gateways, to enable exploring localized point-to-point QoS during VC call based interactions, and to determine and/or implement localized QoS schemes by each of the media gateways that may be optimized based on local criteria. This may enable optimizing overall QoS, and/or enhancing overall user experience, by allowing each media gateway to optimize QoS related parameters within that media gateway, its links, and/or devices directed connected to that media gateway, such as external resources, VC clients, and/or other neighboring media gateways. In other words, in distributed MCU environment, the overall end-to-end QoS associated with particular VC calls may be achieved by, and/or may result from applying separate localized QoS based optimization functions and/or policies in each of the media gateways traversed or utilized during the VC call, with each of these local optimization functions or policies being configured specifically based on local resources.

In accordance with localized QoS optimization based management, each VC client may negotiate the best AV quality, pertaining to both generation and communication of the AV content, based on the available QoS between the VC client and media gateway servicing that VC client. Each media gateway may negotiate the best AV quality based on the QoS available between itself and each of the attached media gateways. Each media gateway may then perform the necessary AV content processing and/or handling based on the negotiated AV quality with attached VC clients and media gateways. The negotiation performed during localized QoS optimization may be based on localized criteria. Exemplary criteria may comprise coder/decoder (codec) availability and/or capabilities, latency associated with AV processing (and resources used therefor) and network interfaces, and/or resources (e.g. processor and/or memory) that may be utilized during various VC related operations in the media gateways and/or connected devices utilized during the VC call. In accordance with the localized QoS management scheme, each VC client and media gateway may perform simple local QoS optimization based on the knowledge of available QoS on the local links. These locally-optimizing entities collectively achieve a much more complex QoS optimization on the global scale. Specifically, with the above algorithm, each VC client will gain the best possible VC experience (for example, in terms of AV quality) with a given overall network condition and a given optimization criterion.

For example, with respect to the example described above, in accordance with an embodiment of the invention, implementing distributed MCU environment with localized QoS management functions in each of the media gateways, the media gateway 202B may be operable to perform local QoS management, which may be based on determining optimal quality associated with media gateway 202B that may be achieved during content generation and/or communication. The determination of the optimal quality may be based on and/or dictated by available resources and/or capabilities, especially those relating to generation and/or processing of VC related data (e.g. AV content), and/or their corresponding quality profiles. This may comprise both the resources and/or capabilities of the media gateway 202B itself, and of other devices directly or indirectly connected to the media gateway 202B that may participate or be used during in the VC call, comprising, for example, the client device 204C and/or neighboring media gateways (e.g. media gateway 202C and media gateway 202E).

The determination of the optimal quality may also be based on and/or dictated by available links, especially those that may be used to communicate the VC related data (e.g. AV content), and/or their corresponding quality profiles. This may comprise links between the media gateway 202B and other devices directly or indirectly connected to the media gateway 202B that may participate or be used during the VC call, such as the client device 204C and/or neighboring media gateways 202C or media gateway 202E. The same localized QoS management may be performed by each media gateway traversed during the VC call, which may comprise only media gateway 202C when connection 220 is used; or media gateways 202E, 202F, and 202C when connection 222 is used.

Figure 3A:
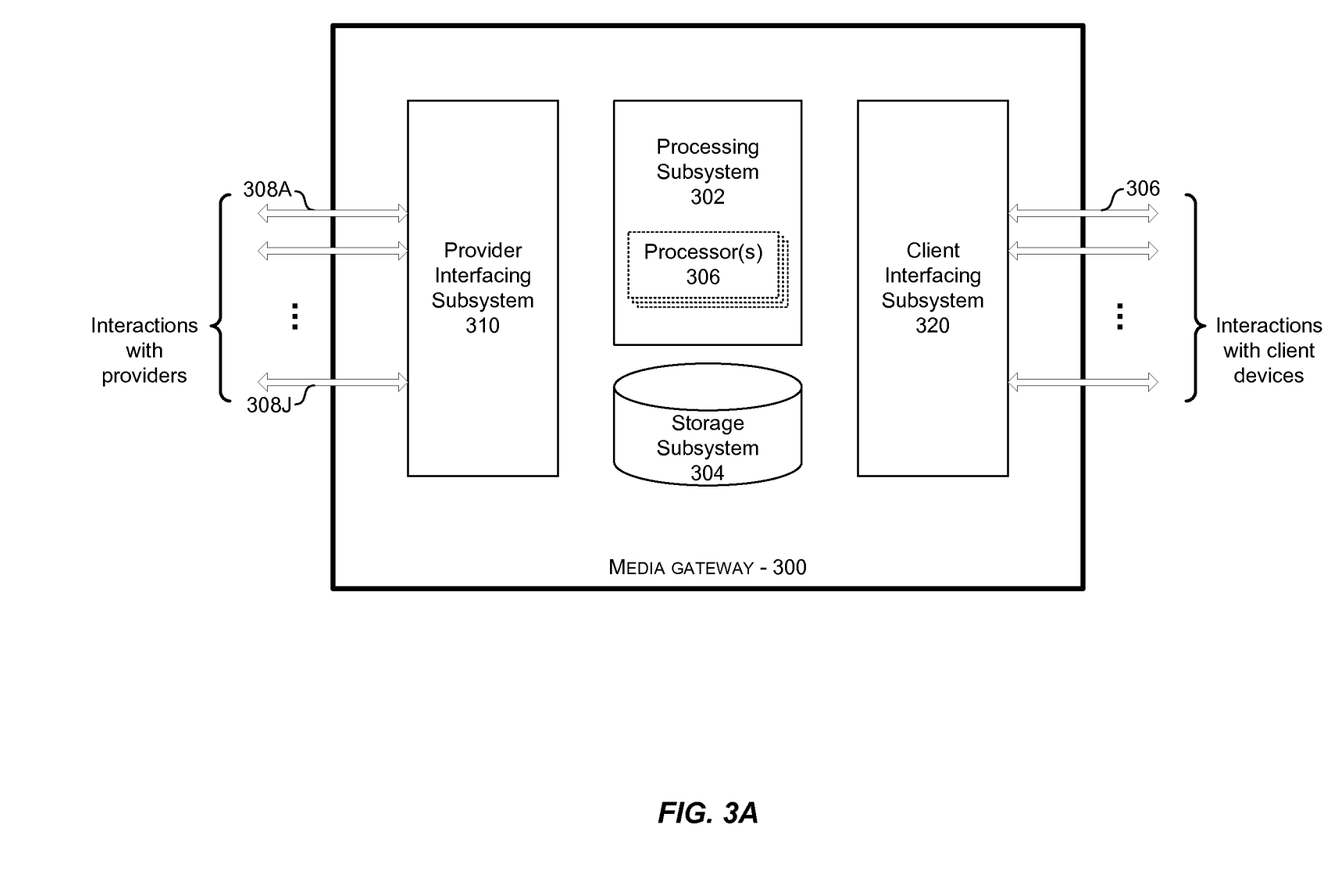
FIG. 3A is a block diagram illustrating an exemplary media gateway that may support Multipoint Control Unit (MCU) operations during video conferencing (VC) applications, in accordance with an embodiment of the invention.

FIG. 3A is a block diagram illustrating an exemplary media gateway that may support Multipoint Control Unit (MCU) operations during video conferencing (VC) applications, in accordance with an embodiment of the invention. Referring to FIG. 3A, there is shown a media gateway 300, which may correspond to the media gateway 102 of FIG. 1, and/or to any of the media gateways 202A-202F of FIG. 2.

The media gateway 300 may comprise multiple hardware and/or software modules and/or subsystems, such as, for example, a processing subsystem 302, a storage subsystem 304, a provider interfacing subsystem 310, and a client interfacing subsystem 320. The media gateway 300 may comprise a singular device or may be implemented in distributed manner, wherein various components and/or functions of the media gateway 300 may be distributed among multiple physical devices. Moreover, the modules listed above are provided by way of illustration and not of limitation. Other configurations and/or architectures of the media gateway 300 may be implemented.

The processing subsystem 302 may comprise suitable logic, circuitry, interfaces, and/or code that may be operable to perform control and/or data processing operations in the media gateway 300. The processing subsystem 302 may be operable to handle and/or process various types of data, such as video and/or audio data, for example. The processing subsystem 302 may process data received from the service and/or content providers, and/or data received from one or more client devices. The processing subsystem 302 may also be operable to control and/or manage operations of the media gateway 300, or various components thereof, and/or executing tasks and/or applications provided therein. In this regard, the processing subsystem 302 may enable execution of applications, programs and/or code which may be stored in the storage subsystem 304, for example. The processing subsystem 302 may be operable to configure and/or control operations of various components and/or subsystems of the media gateway 300, and/or other devices managed by and/or connected to media gateway, by utilizing, for example, one or more control signals. The processing subsystem 302 may comprise, for example, one or more processors 306, which may comprise general purpose processors, such as one or more CPUs, and/or specialized processors, such as one or more dedicated video and/or audio processors. The processor 306 may also comprise one or more secure processors for providing security related operations. While the processing subsystem 302 is shown herein as a single block, the invention needs not be so limited. Accordingly, in instances where the media gateway is implemented a distributed platform, some of the operations and/or functions described herein with regard to the processing subsystems may be performed by different components that may be located in different devices.

The storage subsystem 304 may comprise suitable logic, circuitry, interfaces, and/or code that may be operable to store data used, handled, and/or processed during operations of the media gateway 300. In this regard, the storage subsystem 304 may comprise one or more memory devices that may enable permanent and/or non-permanent storage, buffering, and/or fetching of data, code and/or other information which may be used, consumed, and/or handled in the media gateway 300. For example, the storage subsystem 304 may be utilized to store configuration data, parameters, device information, tracking and/or monitoring information, security information, and intermediate processing data, for example. The storage subsystem 304 may comprise storage media integrated in the media gateway 300 and/or one or more removable storage devices. In this regard, the storage subsystem 304 may comprise different memory technologies, including, for example, read-only memory (ROM), random access memory (RAM), and/or Flash memory.

The provider interfacing subsystem 310 may comprise suitable logic, circuitry, interfaces, and/or code that may be operable to communicate data, via one or more physical connections 308A-308J. The provider interfacing subsystem 310 may be operable to support multiple communication protocols, standards, and/or data transport technologies. In this regard, each of the physical connections 308A-308J may connect the media gateway 300 to different network access service providers, and may comprise a wired, optical/fiber, or wireless connection. The physical layer connections 308A-308J may utilize different physical media and/or different physical protocols. For example, the connection 308A may comprise a DSL over twisted-pair connection whereas and the connection 308J may comprise a CATV over coaxial cable connection. The provider interfacing subsystem 310 may enable accessing and/or communicating with one or more service providers 120 and/or content providers 130, via the delivery networks 110. The provider interfacing subsystem 310 may also be utilized to communicate data to and/or from third parties. In this regard, the provider interfacing subsystem 310 may enable gateway-to-gateway communication and/or interactions between the media gateway 300 and communication devices located outside the home network 100, directly and/or indirectly, such as through intermediary devices and/or distribution networks corresponding to one or more service providers. The provider interfacing subsystem 310 may enable concurrently communicating with multiple and/or different service/content providers and/or devices.

The client interfacing subsystem 320 may comprise suitable logic, circuitry, interfaces, and/or code that may be operable to communicate with one or more client devices in a home network serviced and/or managed by the media gateway 300, such as the home network 100 of FIG. 1. In this regard, the client interfacing subsystem 320 may enable exchanging data and/or messages with the client devices. The client interfacing subsystem 320 may support multiple communication protocols, standards, and/or data transport technologies. For example, the client interfacing subsystem 320 may support the links 106, substantially as describe with regard to FIG. 1.

In operation, the media gateway 300 may be utilized as an interface device providing connectivity between providers (e.g. service and/or content providers) and client devices, such as local client devices in a home network (e.g. the home network 100) serviced by the media gateway 300. The media gateway 300 may enable and/or facilitate reception and/or delivery of content, such as multimedia content, substantially as described with respect to FIG. 1. In this regard, the media gateway 300 may utilize the provider interfacing subsystem 310 in transmitting requests to, and/or receiving content from the service providers 130, via one or more of the delivery networks 110. The media gateway 300 may also be operable to communicate, using the client interfacing subsystem 320, with client devices in a home network serviced by the media gateway 300. In this regard, the client interfacing subsystem 320 may support use of one or more of the links 306, which may be similar to links 106 of FIG. 1. Thus, the media gateway 300 may be operable to communicate content to/from the client devices. The media gateway 300 may also perform, directly via the processing subsystem 302 and/or indirectly using other devices, processing and/or functions associated with handling the content, comprising, for example, encoding/decoding, compression/decompression, encryption/decryption, and/or account validation.

In an exemplary aspect of the invention, the media gateway 300 may be operable to handle at least a portion of processing corresponding to video conferencing (VC) services provided to client devices 104 in the home network 100. In this regard, the media gateway 300 may implement, for example, at least a portion of multipoint control unit (MCU) functions during video conferencing (VC) applications and/or services in a home network, such as the home network 100. For example, the media gateway 300 may be operable to provide MCU functions such as establishing and/or setting multipoint VC calls, adaptively and/or dynamically controlling and/or managing the VC calls, and/or handling at least a portion of audio/video (AV) transcoding performed during VC calls. In this regard, various components of the media gateway 300, such as the processing subsystem 302, may be configured to implement and/or support the MCU functions.

The media gateway 300 may be operable to utilize, in supporting VC related applications and/or services, various existing capabilities and/or resources that may typically be utilized during non-VC operations and/or applications in the media gateway 300. For example, the media gateway 300 may be configured to implemented and/or support a plurality of video and/or audio coder-decoders (codec(s)) which may typically be utilized to support delivery and/or communication of content by client devices serviced by the media gateway 300. Exemplary codec(s) may comprise, for example, H.261, H.263, H.264, MPEG-2, MPEG-4, AVC, VC1 and/or VP6 for video; and WAV, MP3, MP2, WMA, G.711, G.722, G723, G.726, and/or G.729 for audio. Accordingly, the codec(s) may be employed to support various VC applications and/or services being provided via the media gateway 300. In this regard, the media gateway 300 may utilize available codec(s) for transcoding AV content communicated to and/or from serviced client devices during VC calls. In some embodiments, the media gateway 300 may also be operable to perform and/or support segmentation and/or assembly operation associated with content communication via the media gateway 300. In this regard, during content segmentation, content may be split into a plurality of segments that may be communicated separately. Each of the segments may correspond to data carried in a single transport packet for example. During content assembly, the media gateway 300 may be operable to receive and/or buffer a plurality of segments carrying various portions of the content, and may assemble the content from the received segments. In an exemplary embodiment of the invention, the media gateway 300 may provide localized QoS management, substantially as described with respect to FIG. 2. This is described in more details in FIG. 3B.

Figure 3B:
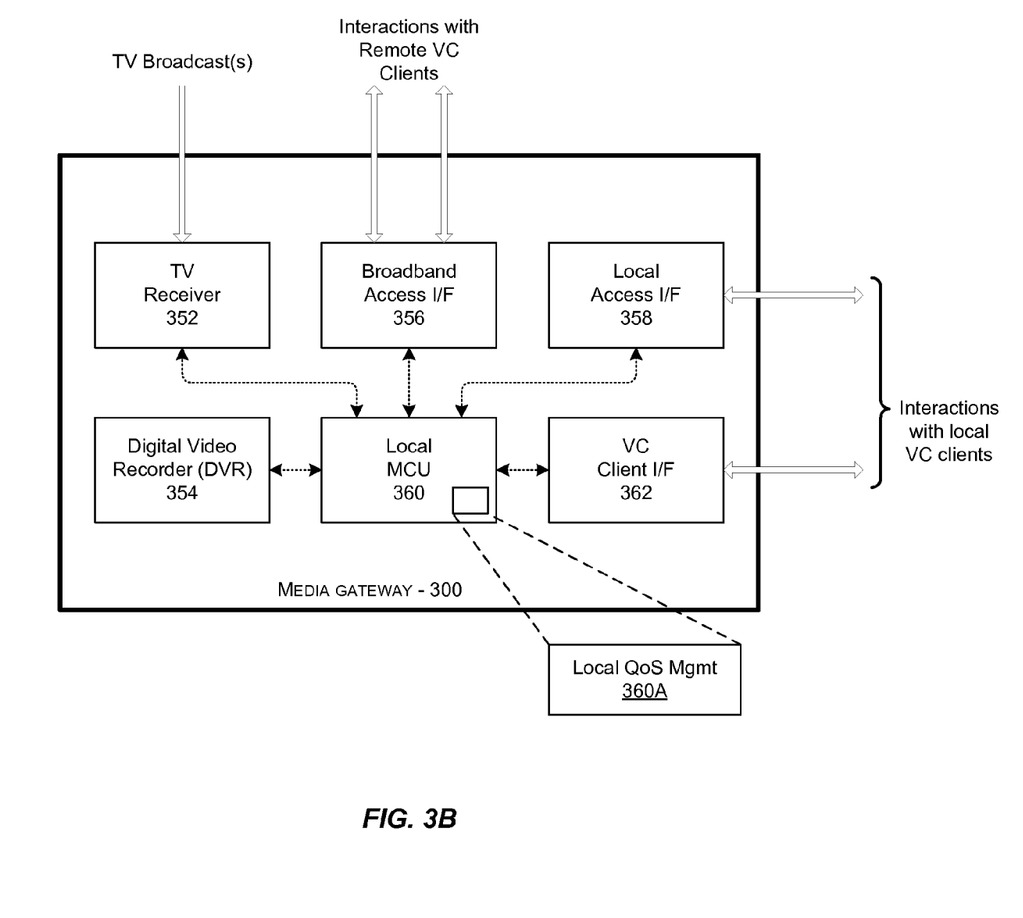
FIG. 3B is a block diagram illustrating an exemplary media gateway that may support local QoS management during video conferencing (VC) applications, in accordance with an embodiment of the invention.

FIG. 3B is a block diagram illustrating an exemplary media gateway that may support local QoS management during video conferencing (VC) applications, in accordance with an embodiment of the invention. Referring to FIG. 3B, there is shown the media gateway 300 of FIG. 3A.

The media gateway 300 may be configured to implement various functions that may be utilized during operations of the media gateway 300, such as when servicing a plurality of client devices in a home network for example. In this regard, the functions may be implemented by and/or incorporated into components of the media gateway 300, such as the processing subsystem 302, the storage subsystem 304, the provider interfacing subsystem 310, and/or the client interfacing subsystem 320. In an exemplary aspect of the invention, at least some of various functions implemented by and/or incorporated into the media gateway 300 may be utilized to support and/or facilitate video conferencing (VC) operations. The media gateway 300 may implement and/or incorporate, for example, a TV receiver function 352, a Digital Video Recorder (DVR) function 354, a broadband access interface (I/F) function 356, and a local access interface (I/F) function 358. The media gateway 300 may also incorporate dedicated video conferencing (VC) functions, such as a local multipoint control unit (MCU) function 360 and a video conferencing (VC) client interface (I/F) function 362.

The TV receiver function 352 may comprise suitable logic, circuitry, interfaces, and/or code that may be operable to handle reception of TV broadcasts, which may be received via over-the-air transmissions, cable connections, and/or satellite signals. In this regard, the TV receive function 352 may enable extraction and/or processing of AV content carried via received TV broadcasts.

The DVR function 354 may comprise suitable logic, circuitry, interfaces, and/or code that may be operable to handle AV content processing associated with digital video recorder operations. In this regard, the DVR function 354 may enable storage of AV content, and/or subsequent retrieval thereof during playback operations.

The broadband access I/F function 356 may comprise suitable logic, circuitry, interfaces, and/or code that may be operable to handle broadband accessing operations via the media gateway 300. In this regard, the broadband access I/F function 356 may support establishing and/or utilizing one or more broadband connections, which may enable providing Internet accessibility for example.

The local access I/F function 358 may comprise suitable logic, circuitry, interfaces, and/or code that may be operable to enable and/or support interactions between the media gateway 300 and client devices serviced and/or access via the media gateway 300. In this regard, the local access I/F function 358 may support establishing and/or utilizing one or more wired or wireless connections between the media gateway 300 and client device(s) serviced by the media gateway 300.

The local MCU function 360 may comprise suitable logic, circuitry, interfaces, and/or code that may be operable to support and/or perform one or more functions associated with conventional video conferencing multipoint control unit (MCU). In this regard, the local MCU function 360 may enable the media gateway 300 to handle at least a portion of processing and/or applications associated with video conferencing (VC) services, substantially as described with regard to FIG. 3A. In an exemplary aspect of the invention, the local MCU function 360 may comprise a local quality-of-service (QoS) management component 360A. The local QoS management component 360A may comprise suitable logic, circuitry, interfaces, and/or code that may be operable to implement and/or perform localized QoS management functions, to optimize quality of service within the media gateway 300, within devices directly and indirectly connected to the media gateway 300, and/or with respect to links therebetween.

The VC client I/F function 362 may comprise suitable logic, circuitry, interfaces, and/or code that may be operable to enable and/or support interactions between the media gateway 300 and client devices utilized as video conferencing (VC) terminals during video conferencing applications and/or serviced by the media gateway 300. In this regard, the VC client I/F function 362 may support exchange of data and/or control information between the media gateway 300 and client devices being utilized as VC terminals during video conference calls.

In operation, the media gateway 300 may be operable to support and/or handle video conferencing (VC) applications and/or services. In this regard, the media gateway 300 may incorporate and/or implement various functions that may support and/or contribute to VC services and/or applications provided by the media gateway 300. For example, the local MCU function 360 may perform various operations typically associated with conventional multipoint control units (MCUs). The local MCU function 360 may provide, for example, overall control and/or management of VC calls established and/or provided via the media gateway 300. In this regard, the local MCU function 360 may determine and/or set routes for exchanging data and/or control information during the VC calls. The local MCU function 360 may utilize, in this regard, information generated and/or maintained by the media gateway 300 pertaining to client devices, networks, and/or other media gateways.

The local MCU function 360 may utilize the broadband access I/F function 356, the local access I/F function 358, and/or the VC client I/F function 362 to connect to and/or interact with devices that may function as VC terminals and/or devices that may be utilized for routing and/or forwarding of data exchanged between the VC terminals during VC calls. For example, the local MCU function 360 may interact with and/or connect local client devices being utilized as VC terminals via the local access I/F function 358 and/or the VC client I/F function 362. The local MCU function 360 may interact with and/or connect to remote media gateways or VC terminals via broadband connections that may be established and/or setup using the broadband access I/F function 356. The local MCU function 360 may also provide and/or perform at least a portion of audio/video (AV) transcoding performed on AV content exchanged during VC calls. In this regard, the local MCU function 360 may utilize available AV transcoding capabilities and/or resources, such as AV codec(s), which may be incorporated and/or implemented by the TV receiver function 352 and/or the DVR function 354, for use to handle AV content received via TV broadcasts and/or retrieved during DVR operations.

In various embodiments of the invention, the local QoS management component 360A may support and/or provide localized QoS management functions during VC applications and/or services of the media gateway 300. In this regard, the local QoS management component 360A may be operable to determine and/or implement one or more localized QoS profiles which may be applied in configuring and/or controlling the generation and/or handling of data (e.g. AV content) exchanged between VC clients during VC calls, the communication thereof. This may enable localized optimization of QoS related parameters within the media gateway 300, devices directly or indirectly connected to the media gateway 300, comprising external resources, VC clients, and/or neighboring media gateways, and/or links between the media gateway 300 and these devices. The localized QoS profiles may enable, for example, setting and/or adjusting one or more QoS related parameters in the media gateway 300 and/or those devices directly or indirectly connected to media gateway 300. The QoS related parameters may pertain to, for example, coder/decoder (codec) functions, processing or communication latencies, and processing or storage resources. For example, the localized QoS profiles may specify which of available video or audio codec(s) to be selected, how the selected codec(s) may be configured and/or adjusted. The localized QoS profiles may also specify selection criteria with respect to available resources, and/or how the selected resources are configured and/or controlled. In addition, the localized QoS profiles may specify selection criteria with respect to available interfaces that may be utilized for communication of data during VC calls, and/or how the selected interfaces may be configured and/or utilized.

In an exemplary embodiment of the invention, the local QoS management component 360A may predetermine various profiles associated with resources and/or capabilities that may be utilized during VC application, to expedite QoS management functions during VC calls. For example, the local QoS management component 360A may determine a plurality of encoding profiles, based on available codec(s), each with varying quality related characteristics and/or limitations. In this regard, the encoding profiles may comprise information pertaining to audio and/or video resolutions (e.g. desired, minimum, etc.); codec types that may be utilized or selected, and/or information related to of audio and video segmentation operations. The local QoS management component 360A may also determine a plurality of communication profiles, based on available interfaces—that is available physical layers and corresponding communication protocols for use thereof. In this regard, each of the plurality of communication profiles may comprise different quality related characteristics and/or limitations. The communication profiles may comprise information pertaining to and/or specifying physical layer types that may be used, interface protocol types that may selected in setting up the link(s) utilized during VC related communication, bandwidth, and/or latency. In addition, the local QoS management component 360A may determine a plurality of resource allocation profiles, based on available resources and/or capabilities. In this regard, the plurality of communication profiles may specify different combinations with respect to selection and/or configuration of available resources, resulting in varying quality related characteristics and/or limitations. The resource allocation profiles may comprise information pertaining to and/or specifying resource types, priority (during use thereof), and/or maximum allowed load of selected resources. Accordingly, the local QoS management may comprise selecting an encoding profile, a communication profile, and/or a resource allocation profile from these predetermined profiles.

Figure 4:
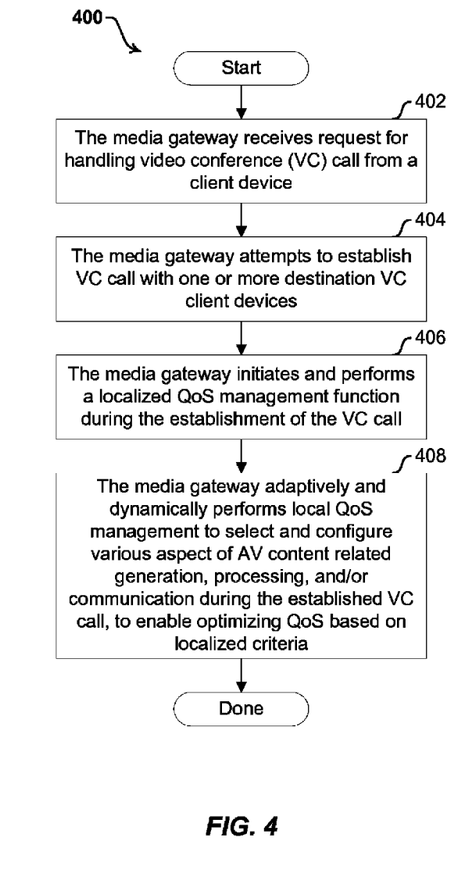
FIG. 4 is a flow chart that illustrates exemplary steps for supporting distributed local QoS optimization functions using integrated media gateways during video conferencing (VC) applications, in accordance with an embodiment of the invention.

FIG. 4 is a flow chart that illustrates exemplary steps for supporting distributed local QoS optimization functions using integrated media gateways during video conferencing (VC) applications, in accordance with an embodiment of the invention. Referring to FIG. 4, there is shown a flow chart 400 comprising a plurality of exemplary steps which may be performed to facilitate distributed localized QoS optimization to achieve global QoS optimization during video conferencing services.

In step 402, a media gateway, such as the media gateway 300 of FIGS. 3A and 3B, which may be operable to function as MCU during video conferencing (VC) applications, may receive request for handling video conference (VC) call from a client device serviced by the media gateway. In step 404, the media gateway may attempt to establish, in response to the received request, a VC call between the requesting client device and one or more destination VC client devices. In this regard, the destination VC client devices may be located within and/or external to a home network serviced by the media gateway. In step 406, the media gateway may initiate, and perform thereafter localized QoS management during the establishment of the VC call. In step 408, the media gateway may adaptively and dynamically perform the local QoS management function during the established VC call, to enable selecting and/or configuring various aspects of AV content related generation, processing, and/or communication during the established VC call in a manner that enables optimizing QoS based on localized criteria.

Various embodiments of the invention may comprise a method and system for using distributed local QoS optimization to achieve global QoS optimization for video conferencing services. The media gateway 300 may provide and/or support video conferencing (VC) services and/or applications, by handling, for example, at least a portion of video conferencing (VC) processing required during video conference calls between client devices serviced by the media gateway 300 and one or more other video conferencing (VC) terminals. In this regard, the media gateway 300 may perform and/or handle, via the local MCU function 360, one or more functions that are offloaded from one or more centralized video conferencing (VC) multipoint control units (MCUs). Exemplary MCU functions may comprise control and/or management of video conferencing (VC) calls, and/or audio/video (AV) transcoding associated with content exchanged during the video conferencing (VC) calls. The video conferencing (VC) call control and/or management may comprise determining and/or establishing routing paths utilized in exchanging data during video conference (VC) calls.

The media gateway 300 may handle and/or perform localized QoS management functions during VC calls. In this regard, the local QoS management performed by the media gateway 300 may comprise an adaptive localized QoS optimization directed at setting and/or adjusting one or more QoS related parameters in the media gateway 300, and/or in one or more client devices and/or neighboring media gateway 300 directly or indirectly connected to the media gateway 300. Exemplary QoS related parameters may comprise, or pertain to local resources and/or links that may be utilized during VC operations. This may comprise coder/decoder (codec) functions, processing or storage resources, processing criteria (e.g., latency, load, and priority), communication interfaces, and/or communication criteria (bandwidth, latency, error, etc.). The media gateway 300 may negotiate at least some of the QoS related parameters with one or more of the plurality of client devices and/or the other media gateway 300 directly or indirectly connected to the media gateway 300. The media gateway 300 may determine a plurality of profiles associated with resources and/or capabilities utilized during VC operations, such as encoding profiles, communication profiles, and/or resource allocation profiles. The media gateway 300 may then select one or more these profiles during local QoS management operations, based on quality characteristics and/or or limitations associated with each of these profiles.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for using distributed local QoS optimization to achieve global QoS optimization for video conferencing services.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   handling, by a media gateway that services a plurality of client devices, at least a portion of video conferencing (VC) processing for a video conference call conducted by at least one of the plurality of client devices, wherein:
   the at least a portion of the VC processing handled by the media gateway is diverted from a VC management device; and
   the VC processing handled by the media gateway comprises quality of service (QoS) management upon an establishment of and during the video conference call.

2. The method of claim 1, wherein the QoS management further comprises controlling generation or communication of audio-video (AV) content exchanged upon the establishment of and during the video conference call.

3. The method of claim 1, comprising adaptively configuring, by the media gateway, the QoS management according to a local QoS optimization, wherein the local QoS optimization comprises setting or adjusting at least one QoS-related parameter in the media gateway, at least one of the plurality of client devices, or in a second media gateway connected to the media gateway.

4. The method of claim 3, further comprising negotiating, by the media gateway, the QoS-related parameter with at least one of the plurality of client devices or the second media gateway connected to the media gateway.

5. The method of claim 3, wherein the QoS-related parameter comprises coder/decoder (codec) functions, processing latency, communication latency, or storage resources.

6. The method of claim 3, further comprising selecting, by the media gateway during the local QoS optimization, an encoding profile from a set of different encoding profiles, the set of different encoding profiles comprise audio and video resolutions, coder/decoder (codec) types, or sizes of audio and video segments.

7. The method of claim 3, further comprising selecting, by the media gateway during the local QoS optimization, a communication profile from a set of different communication profiles, the set of different communication profiles comprising physical layer type, interface type, bandwidth, or latency.

8. The method of claim 3, further comprising selecting, by the media gateway during the local QoS optimization, a resource allocation profile from a set of different resource allocation profiles, the set of different resource allocation profiles comprising resource type, priority, or maximum load.

9. A system, comprising:
   a media gateway comprising circuitry configured to service a plurality of client devices, the circuitry being operable to handle at least a portion of video conferencing (VC) processing for a video conference call via at least one of the plurality of client devices, wherein:
   the at least a portion of the VC processing handled by the media gateway is diverted from processing on a centralized VC multipoint control unit (MCU); and
   the VC processing handled by the media gateway comprises management of quality of service (QoS) upon establishing and during the video conference call.

10. The system of claim 9, wherein the QoS management comprises controlling generation or communication of audio-video (AV) content exchanged upon the establishing and during the video conference call.

11. The system of claim 9, wherein the circuitry is further operable to adaptively configure the QoS management via the media gateway based on local QoS optimization, wherein the local QoS optimization comprises setting or adjusting a QoS related parameter in the media gateway, in at least one of the plurality of client devices, or in at least one other media gateway connected to the media gateway.

12. The system of claim 11, wherein the circuitry is further operable to negotiate the QoS related parameter with at least one of the plurality of client devices or the other media gateways connected to the media gateway.

13. The system of claim 11, wherein the QoS related parameters pertain to coder/decoder (codec) functions, processing latency, communication latency, and processing or storage resources.

14. The system of claim 11, wherein the circuitry is further operable to select, during the local QoS optimization, an encoding profile from a set of different encoding profiles, the set of different encoding profiles comprise audio and video resolutions, coder/decoder (codec) types, or sizes of audio and video segments.

15. The system of claim 11, wherein the circuitry is further operable to select, during the local QoS optimization, a communication profile from a set of different communication profiles, the set of different communication profiles comprising physical layer type, interface type, bandwidth, or latency.

16. The system of claim 11, wherein the circuitry is further operable to select, during the local QoS optimization, a resource allocation profile from a set of different resource allocation profiles, the set of different resource allocation profiles comprising resource type, priority, or maximum load.

17. A media gateway, comprising:
   an interfacing subsystem, wherein:
   the interfacing subsystem supports a plurality of different physical layers and a plurality of different communication standards or protocols for use during communication via the plurality of different physical layers; and
   the interfacing subsystem enables communication with at least one external resource, at least one client device, at least one other media gateway, and at least one access network associated with a particular network access service provider; and
   a processing subsystem that is operable to perform a plurality of functions or applications during operations in the media gateways, wherein the operations comprise a localized QoS management that is limited to the media gateway, to at least one of a plurality client devices coupled to the media gateway, and at least one of a plurality of neighboring media gateways coupled to the media gateway.

18. The media gateway of claim 17, wherein the localized QoS management comprises determining, setting, or adjusting a QoS related parameter in the media gateway, in at least one external resource coupled to the media gateway, in at least one client device coupled to the media gateway, or in at least one neighboring media gateway coupled to the media gateway.

19. The media gateway of claim 17, wherein the processing subsystem is operable to create an encoding profile for use in encoding data communicated via the media gateway, at least one communication profile for use in the communicating the data, or at least one resource allocation profile for use in allocating resources utilized during handling of the data.

20. The media gateway of claim 19, wherein the processing subsystem is operable to adaptively adjust the encoding profile during the operations of the media gateway.

* * * * *